Feb. 13, 1940.  L. M. SHELDON  2,190,274
METHOD OF BLEACHING CELLULOSE
Filed Nov. 28, 1936
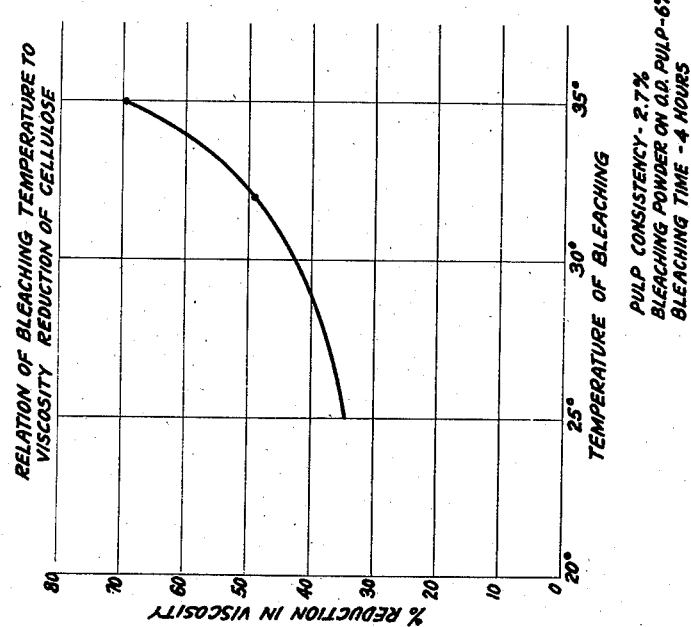
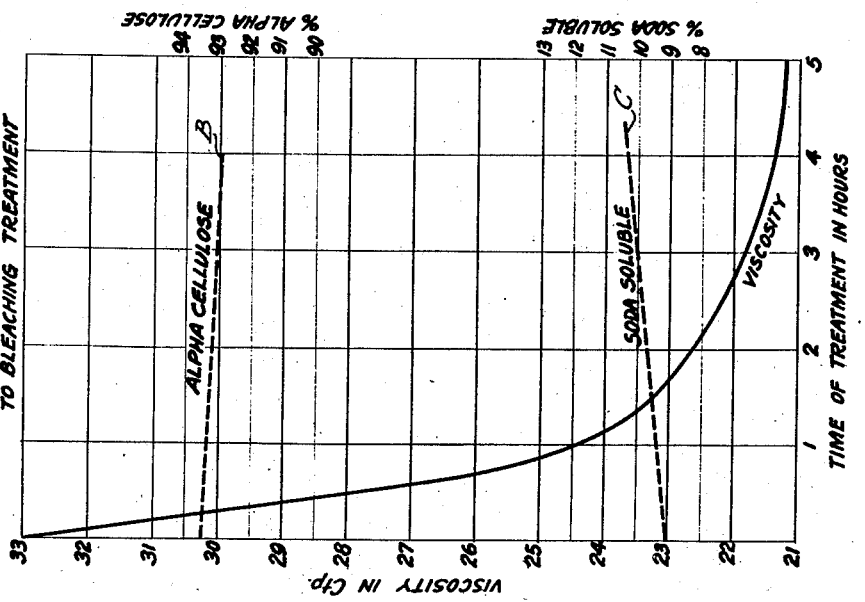
INVENTOR
Lyle M. Sheldon
BY
Edwards, Bruce & Pool
ATTORNEYS Patented Feb. 13, 1940

2,190,274

UNITED STATES PATENT OFFICE 2,190,274

METHOD OF BLEACHING CELLULOSE

Lyle Melvin Sheldon, East Alton, Ill., assignor to The Cellulose Research Corporation, East Alton, Ill., a corporation of Delaware Application November 28, 1936, Serial No. 113,115

2 Claims. (Cl. 8—105)

This invention relates to the production of wood cellulose suitable for esterification, and more particularly to the control of the solution viscosity of cellulose for use in the production of derivatives.

A primary object of the invention is to provide a step in the process of purifying wood cellulose to a quality suitable for esterification, which comprises reducing the solution viscosity of the cellulose to a predetermined value by means of a hypochlorite bleach treatment without effecting any deleterious chemical or physical degradation of the cellulose.

Another object of the invention is to provide a process for producing purified wood celluloses capable of conversion into esters, ethers, regenerated cellulose, and particularly into cellulose acetate, characterized by the uniformity of the solution viscosity of the celluloses between successive batches.

A still further object is to provide an unbleached wood pulp of high solution viscosity, such that in the process of purifying the pulp to render it capable of esterification the solution viscosity of the cellulose may be controlled to any desired value up to the order of 40 centipoises without incurring any detrimental physical or chemical degradation of the cellulose.

Another object of the invention is to provide a process of controlling the solution viscosity of purified wood cellulose to any desired value, comprising treating the cellulose in a hypochlorite bleach solution in such a manner that the treatment is terminated at or about the time the rate of depolymerization becomes relatively small and before any substantial degradation of the cellulose takes place.

Other objects will be obvious.

In the following description and accompanying drawing:

Figure 1 illustrates certain characteristics of the viscosity reduction curve resulting from a controlled hypochlorite bleach treatment; and Figure 2 illustrates the relation of temperature to viscosity reduction of cellulose under constant conditions of bleaching.

Primary requirements of cellulose for use in the manufacture of cellulose esters, ethers, and other derivatives are a high degree of purity and a uniformity of the physical and chemical properties of the cellulose between successive batches or lots. Of these properties, the uniformity of the cuprammonium solution viscosity of the cellulose is one of the most important considerations. While the manufacturers of some derivatives, such as viscose rayon and Cellophane, do not demand quite so high a state of purity as the producers of cellulose acetate and certain cellulose esters, the uniformity of the product between successive lots, particularly with respect to the solution viscosity, is in most cases a nearly indispensable requirement. In addition, a wide range of solution viscosity of the cellulose product is demanded by the different conversion processes in which it is to be used. Viscose rayon, for example, requires a relatively low viscosity of the order of 10 to 12 centipoises, while the manufacturers of cellulose acetate, on the other hand, prefer a base cellulosic material for their use of as high a viscosity as possible, preferably about 30 and even 40 centipoises.

The cuprammonium viscosity of cellulose is an exceedingly sensitive measure of chemical degradation resulting from improperly controlled refining practices or over-treatment of the cellulose. Chemical degradation, which is typical of the processes of the prior art, is usually indicated by the cuprammonium solution viscosity of the cellulose long before the undesirable form of depolymerization has advanced sufficiently to be reflected by such measurements as the alpha content and soda solubility of the material. Accordingly, where cellulose is to be used for purposes in which uniformly unimpaired physical and chemical properties of the material are a prime consideration, the viscosity measurement affords an excellent means of controlling the processing steps to avoid such degradation and insure uniformity between successive batches of the cellulose.

In preparing cellulose for nitration, especially in the low viscosity lacquer cellulose nitrate field, much work has been done in developing means for reducing the viscosity of the cellulose prior to nitration. As a result many reagents and methods are known in the art for reducing cellulose viscosity, among them being treatment with hypochlorite solutions.

The process of the present invention likewise comprises treatment of cellulose with hypochlorite solution to reduce the solution viscosity and increase the purity. However, it differs distinctly from prior art practices in that for the first time a process has been developed by which the viscosity of the cellulose can be reduced to any normal desired level with practically no degradation of the cellulose. Another feature of the present invention is the control of the solution viscosity of wood celluloses to a predetermined, nearly invariable value between successive batches.

Any desired reduction in solution viscosity that may be required is effected under conditions which operate as if they had permitted the severance of the secondary valence bonds which bind the long chain molecules into aggregates or bundles and avoid any substantial destruction of the primary valence bonds through "scission" or reduction of the chain lengths. Thus, by means of a controlled preferential method of imparting any desired solution viscosity to the purified cellulose, the result is achieved without any substantial degradation of the cellulose as measured by its alpha content and soda solubility. This is accomplished irrespective of the viscosity level in the purified material within the range of useful values up to the order of 40 centipoises.

The present invention, therefore, consists in treating wood celluloses of diverse cuprammonium solution viscosities in a hypochlorite solution to reduce the viscosity to any desired, predetermined level. The conditions of treatment are controlled in such a manner as to avoid any detrimental chemical degradation of the cellulose.

In carrying out the invention, any wood cellulose may be used as the raw material. However, it is preferable to use cellulose which has been chlorinated to remove lignin and other non-cellulosic impurities, or even further purified. It has been found preferable not to reduce the viscosity of the cellulose with hypochlorite solution more than 30 to 40 centipoises, since a greater reduction of viscosity usually results in an undesirable chemical degradation of the cellulose as measured by decreased alpha cellulose content and increased soda soluble content. Therefore, a limitation is imposed on the amount of viscosity reduction which it is feasible to accomplish with a given wood pulp depending upon its viscosity. For instance, if it is desired to reduce the viscosity of a pulp to about 10 centipoises, the viscosity of the starting material should preferably not be more than about 30 to 35 centipoises. If a 20 centipoise pulp is desired, the viscosity of the starting material should preferably not be more than 50 to 60 centipoises. It is recognized that reduction of viscosity into the abnormally low range of 5 centipoises or less may result in marked degradation of cellulose.

When cellulose is subjected to treatment with a hypochlorite solution a fairly rapid drop in the solution viscosity of the cellulose occurs in the early stages of the treatment. This is followed by a period in which the rate of reduction is relatively small. This is shown graphically in Figure 1, where it will be observed that a starting material with a viscosity of 33 centipoises, treated at 3% consistency with 0.16% concentration of hypochlorite at 20° C., has its viscosity reduced to about 24.5 centipoises in 1 hour. Thereafter the rate of reduction falls off rather rapidly and in the succeeding 4 hours the value is reduced only an additional 3 centipoises.

In carrying out the process of the present invention the hypochlorite treatment is continued until the relatively level portion of the viscosity reduction curve is reached. In this manner the treatment may be readily terminated at the desired viscosity level since the rate of reduction is relatively small and the desired time to give the required value calculated with precision.

By further reference to Figure 1, it will be seen that the alpha cellulose content of the pulp during the 4 hour treatment with hypochlorite under conditions as described is reduced by no more than 0.5% and the soda solubility of the pulp increased by less than 1.5%. From this it will be properly inferred that under the conditions of treatment the viscosity of the cellulose may be reduced from its original value of 33 centipoises to approximately 21 centipoises without too great a degree of chemical degradation of the cellulose. By the practice described, a maximum reduction of cellulose viscosities is obtained with a minimum of cellulose degradation.

Four major variables of the bleaching treatment should be correlated to control the rate and degree of viscosity reduction, namely, the pH of the solution, the concentration of hypochlorite in the solution, and the time and temperature of treatment. By increasing the pH of the solution from 7.0 upward, the rate and degree of viscosity reduction decreases. Increasing the concentration of hypochlorite in the solution increases the rate and degree of viscosity reduction. Increasing the time of treatment increases the degree of viscosity reduction to a limited extent only, as shown in Figure 1. Increasing the temperature of treatment increases both the degree and rate of viscosity reduction.

Therefore, being given the original viscosity of the material to be treated, by running a limited number of control treatments it is possible to establish a control curve similar to that shown in Figure 2 in which three of the above mentioned variables are held constant and the fourth is varied to obtain the desired cellulose viscosity. It has been found convenient in most cases to hold the pH, concentration of hypochlorite, and the time of treatment constant and to vary the temperature (as shown in Figure 2). However, it is to be understood that the present invention is not limited to control of temperature of treatment in reducing the cellulose solution viscosity. Control of this variable is shown only by way of illustration.

One of the important features of the process of this invention is the method of controlling the solution viscosity of the pulp in its early stages of refinement in such a manner as to attain any predetermined viscosity value in the end product and to maintain the desired value within exceedingly close tolerances between successive batches. One way of attaining this is by treating pulp whose properties have been previously brought to a uniform value by the controlled chlorination and causticizing practice described in detail in the copending application of Sheldon et al., Serial No. 112,304, filed November 23, 1936. By means of the treatments therein described, successive batches of raw wood pulps of diverse bleachabilities and other properties are brought to a substantially uniform bleach value of the order of 1.5% and have their other properties leveled out to nearly invariable, uniform values. These successive batches of pulps, after the chlorination and causticizing treatment referred to, will be found generally to have variable solution viscosities. Such variable viscosities of the chlorinated pulps, however, can be quite accurately reduced to a predetermined value by treatment in a hypochlorite solution in which the pH, bleach concentration, and time are held constant and the desired reduction effected by regulating the temperature at which the reaction proceeds. For example, by reference to Figure 2, it will be seen that if the viscosity of the chlorinated pulp is 34 centipoises and it is desired to reduce it to 22 centipoises, the treatment may be conveniently carried out at 25° C. at a pH of 9.0 and a bleach concentration of 0.16% for 4 hours. The treatment is so designed as to effect the reduction to the desired value by means of the hypochlorite treatment at or near the point in the viscosity reduction where the curve begins to flatten out. Any substantial action of the bleach solutions on the cellulose in the nearly level region of the viscosity curve is avoided. The reason for this practice arises from the fact that it has been found that after the rapid fall in viscosity has occurred, "scission" of the long chain molecules tends to take place with resulting chemical degradation of the cellulose. If the treatment is allowed to continue for a sufficient length of time after the curve flattens out, a reduction in the alpha cellulose content and a corresponding increase in the soda soluble values will occur. It has likewise been found that the necessary purifying and decolorizing action of the bleaching treatment is satisfactorily accomplished during the viscosity reduction treatment and that it is not necessary to continue the bleaching treatment on the level portion of the viscosity curve for this purpose.

In order more particularly to describe the present invention, there follow typical embodiments of the invention, which are designated as Examples A and B. It will be understood that the various features set forth in connection with these embodiments are by way of illustration only and are not to be construed in a limiting sense.

EXAMPLE A

Completely defibered spruce sulfite pulp is made up into a water slurry of 2.7% consistency in a container provided with sufficient agitation equipment to insure thorough mixing. The analysis of the pulp is as follows:

|  | Per cent |
|---|---|
| Alpha cellulose | 93.3 |
| Soda solubility | 9.5 |
| Viscosity (ctps.) | 60.6 |
| Bleachability | 1.1 |

If it is desired to reduce the solution viscosity of the pulp to about 21 centipoises, this reduction may be obtained by carrying out the bleach treatment at approximately 35° C. with a bleach solution of 2.7% consistency at a pH of 9.0, containing 6% bleaching powder based on the weight of cellulose (oven dry basis) and a time of treatment of 4 hours (as shown in Figure 2).

Accordingly, the pH of the water slurry of the pulp was adjusted with mineral acid to 7.4 and the temperature to 35° C. A solution containing 65.3 grams of calcium hypochlorite per liter and saturated with calcium hydroxide was then added in sufficient amount to give a 6% bleaching powder, based on the pulp, or a bleach concentration of 0.16%. Under these conditions the pH of the pulp and bleached powder slurry is about 9.0.

The treatment was continued for 4 hours, maintaining the temperature at about 35° C. throughout the period. Upon the termination of the treatment, the pulp was washed with water until free of available chlorine. This may be conveniently done on an Oliver filter or any other suitable apparatus.

After the treatment, the pulp will have an analysis of

|  | Per cent |
|---|---|
| Alpha cellulose | 93.0 |
| Soda solubility | 10.9 |
| Viscosity (ctps.) | 21.5 |
| Bleachability | 0.5 |

Thus it will be seen that the solution viscosity of the pulp has been brought to within 0.5 centipoise of the desired value and the bleachability reduced to less than 1%, while the alpha and soda soluble values remain practically unchanged.

EXAMPLE B

If it is desired to prepare a cellulose having a viscosity of about 27 centipoises from completely defibered yellow birch sulfite wood pulp having an analysis of

|  | Per cent |
|---|---|
| Alpha cellulose | 86.0 |
| Soda solubility | 23.0 |
| Viscosity (ctps.) | 32.1 |
| Bleachability | 3.5 | the following procedure may be used.

Since the desired reduction in viscosity is only 5.1 centipoises, i. e., from 32.1 to 27, it is necessary to use fairly mild bleaching conditions. A few control tests were made to determine the desirable conditions.

About 4 hours has been found a convenient operating period for carrying out the bleaching treatment, so the time was held constant at 4 hours. It was decided to hold the pH constant at 9.0 and vary the concentration and temperature in the control tests to get the desired result. Test bleaches were then carried out using 2%, 3%, and 4% bleaching powder concentration at 20°, 25°, and 30° C. It was found that the proper degree of viscosity reduction could be obtained by using a 3% pulp consistency, 3% bleaching powder (based on the weight of oven dry pulp), a pH of 9.0, a temperature of 21° C., and 4 hours bleaching time.

The pulp was then made up into a water slurry of 3% consistency, the pH adjusted to 7.5 with mineral acid, and the temperature adjusted to 21° C. A solution containing 70 grams of calcium hypochlorite per liter and saturated with calcium hydroxide was added in sufficient amount to make 3% bleaching powder on the pulp, or a 0.09% bleaching powder solution. It is to be noted that this concentration of hypochlorite is considerably less than that used in Example A or employed in the illustration of Figure 2. This is because it was found desirable to use a lower concentration at the lower temperature of 21° C. since a reduction of only about 5 centipoises in the viscosity was desired.

The treatment was continued for 4 hours, maintaining the temperature at 21° C. At the end of this period the pulp was washed until free of available chlorine. It then had the following analysis:

|  | Per cent |
|---|---|
| Alpha cellulose | 86.2 |
| Soda solubility | 22.4 |
| Viscosity (ctps.) | 27.3 |
| Bleachability | 1.2 |

The foregoing examples serve to point out in a detailed manner certain embodiments of the present invention. However, the scope of the present invention will be more readily understood and its implications will become more apparent in view of the following considerations of the more or less theoretical aspects of the invention and its processes and products as described hereinafter.

The viscosity of the cellulose in solutions has long been considered as associated with a state of complexity of the cellulose molecules. By control of viscosity is usually meant the regulation of digestion and purification of the cellulose in such a manner that the original lengths of the cellulose molecules are maintained or reduced to any desired extent.

In studying the action on cellulose of dilute solutions of mineral acid in water, in acetic acid, and bleach solutions, it has been found that there occurs a rapid initial decrease in the cuprammonium viscosity of the cellulose. This is accompanied by only an insignificant effect on the alpha cellulose and soda soluble content. The curves B and C of Figure 1 show this stability of the alpha cellulose under the treatment. It will be observed that at the end of the 4 hour treatment, the values of alpha and soda soluble material have changed less than 1.5%. The observed facts may be interpreted as indicating that during the period of rapid viscosity decrease the cellulose is being depolymerized to molecules which still exist in a comparatively high state of polymerization. This is explained by assuming the effect of the treatment to be largely a dissolution of the secondary valence bonds which hold the chain molecules in bundles. That is, the chains comprising the bundles are separated without substantial "scission" or reduction in chain lengths. The membranes inclosing structural units of the fibers may also be disrupted or altered, and further treatment results in cellulose degradation products, i. e., chain molecules that are soluble in strong caustic solutions.

Accordingly, one of the important features of the present invention is that minimum degradation is obtained when the treatments, which affect the state of polymerization of the cellulose, are terminated at a point where the rate of viscosity reduction is small on further treatment. By carefully regulating such treatments to accomplish this result, a purified cellulose is obtained, characterized by a maximum retention of long chain molecules. It is believed that such celluloses are capable of imparting greater strength properties to the resulting derivatives than those in which substantial depolymerization has occurred.

In the present invention employing a controlled bleaching technic, the cellulose behaves as if the secondary valence bonds only had been severed. The bleaching is followed by a controlled mercerization, one function of which is to increase the swelling of the cellulose which pushes apart the long chain molecules. It is probable that esterifying reagents are then able to penetrate the space between the molecular chain bundles and reach those hydroxyl groups which otherwise remain inaccessible. If the same degree of viscosity reduction had been effected mainly by "scission," leaving the organized crystallites of cellulose in the form of bundles of shorter chain lengths but still with substantially the same number of chains per bundle, then it seems clear that these bundles would still be difficulty penetrable by the acetylating or other reagents. Their only recourse would be to attack the superficial hydroxyl groups and erode the bundles layer by layer until the inner chains in the bundles are exposed. The internal portions of the bundles may not ever be made accessible, due to imperfect agitation, insufficient time of treatment or other causes. Thus, there will result an excessive amount of haze in the solutions of the acetate due to incomplete accessibility of the hydroxyl groups to the reagents.

It must be understood, however, that severing the primary valence bonds does not necessarily involve an undesirable chemical change. The depolymerized material may still be highly polymerized anhydro-glucose units. The "scission" action may be so controlled, and in the process of the present invention is controlled, to maintain a relatively high state of polymerization. Most conventional purification processes do involve degradation and result in the formation of compounds other than polymerized anhydro-glucose units such as oxycellulose, gluconic acids, or even completely depolymerized glucose. The presence of such low polymers in the cellulose tends to seriously reduce or even permanently impair the permeability and reactivity of the cellulose upon drying. This is due to the irreversible nature of the horny, impenetrable gel structure of these low polymers and associated degraded substances which form as the moisture content of the cellulose is reduced.

The product of this invention is substantially free of those low polymers resulting from degradation. This is in sharp contrast to the physical and chemical condition of wood celluloses of the prior practices.

It must be understood, however, that the cuprammonium viscosity is not necessarily an invariable indication of the degree of uniformity of the polymerization of the cellulose molecules comprising the cellulose product. For example, a viscosity of 30 centipoises, depending upon the character of the pulp and the purification treatments to which it has been subjected, may be merely a statistical average of the widely varying viscosities of components composing a given sample. Whereas, to be a direct indication of the uniformity of the polymers, the viscosity must be a measure of an average of a sample whose components vary in viscosity by a relatively small amount from the desired average. The product of the present invention falls within the latter class since the controlled mild purification treatments are designed to remove the lower cellulose polymers and converge the varying viscosities which may exist initially in the raw pulp. Therefore, a distinguishing feature of the present invention is a much improved uniformity of the molecular chain lengths of the cellulose.

In the foregoing specification and following claims, terms have been used having the following meanings:

*Chemical degradation.*—By this expression we mean the result of chemical action, especially in an oxidizing medium whereby the cellulose molecule is attacked and converted into a different compound. It is probable that this attack first occurs at an oxygen bridge and that oxidation to an aldehyde or an acid occurs. This action is to be distinguished from hydrolytic scission of the long chains in which water enters the molecule to give two hydroxyl groups at the adjoining ends of the severed chain.

*Alpha cellulose* is defined as that portion of a sample of cellulosic material not dissolved by 17.5% sodium hydroxide solution at 20° C. determined by a refinement of the method described by H. F. Lewis in "Technical Association Papers," Series XVII, #1, 436 (1934).

*Soda soluble material* is defined as that portion of a cellulosic sample dissolved when it is subjected to the action of 7.14% sodium hydroxide solution at the boiling point of water for 3 hours by a refinement of the method described by Griffin, "Technical Methods of Analysis," 492 (1927 ed.).

*Bleachability of cellulose*, as used herein, is a measure of the materials oxidizable by potassium permanganate in the presence of an acid, and is expressed in terms of standard bleaching powder containing 35% available chlorine. The determination consists of treating a 1 gram sample of material completely dispersed in 750 cc. of a solution composed of 0.133N sulfuric acid and N/300 potassium permanganate for 5 minutes at 25° C.; reacting the unconsumed potassium permanganate with potassium iodide, and back titrating with sodium thiosulfate. A detailed description of the method, including the conversion table for expressing the permanganate number in terms of per cent bleaching powder of 35% available chlorine, was published by T. A. P. P. I., Series, XVII, #1, 146 (1934) "Permanganate Number of Pulp," by R. N. Wiles.

*Cuprammonium viscosity*, as used herein, means the viscosity number or value obtained according to the following method: The cuprammonium solution was prepared by the action of air on electrolytic copper in the presence of strong ammonia water. The copper concentration of the solutions employed for viscosity determinations was 30. ± 2 g. per liter and the ammonia content was 165 g., ± 2 g. per liter. The concentration of cellulose employed was 0.6 g. (oven dry basis) per 100 cc. of cuprammonium solution. The cellulose sample for this determination was dried at 70° C. to 4% moisture content. After weighing out 0.6 g. (oven dry basis), the sample was moistened, squeezed to a uniform weight of 2 g. and then dispersed in cuprammonium solution in an atmosphere of hydrogen from which oxygen has been completely removed. The viscosity measurements were made at 25° C. with a modified Ostwald pipet, constructed according to the specifications of the American Chemical Society Committee on the Viscosity of Cellulose (Journal of Industrial & Engineering Chemistry, I, No. 49; 1929). The time of flow in seconds was converted to centipoises on the basis of the calibration of the pipet with oils of known viscosity in centipoises obtained from the United States Bureau of Standards.

*Viscosity control*

1. The change in viscosity obtained by separating the long chain molecules in the natural existing aggregates or bundles from each other by destroying the secondary valence forces binding them together is referred to herein as a "splitting" action.

2. The reduction in viscosity obtained by depolymerization, which involves the destruction of the primary valence bonds, thereby reducing the chain lengths of the individual cellulose molecules is referred to herein as a "scission" action.

As many changes could be made in carrying out the composition and processess without departing from the scope of the invention, it is intended that all matter contained in the above descriptions and drawing be interpreted as illustrative only, and not in a limiting sense.

I claim:

1. The process of treating wood cellulose to attain a predetermined color and viscosity comprising providing a sulphite wood pulp having a bleachability less than 5% and a viscosity not more than 40 centipoises above the viscosity of the pulp after bleaching, treating said pulp with a hypochlorite bleach solution at a pH greater than 7 and at a concentration of the bleach solution substantially in excess of that normally required to give the final color attained in the bleached pulp, continuing said treatment to bleach the pulp and reduce its viscosity not more than 40 centipoises at a rate of viscosity reduction which is first substantially constant and then decreases toward a substantially constant lower value, and terminating said bleach by washing the pulp free of treating reagents before the substantially constant lower rate of viscosity reduction is reached and before exhaustion of the bleach and without substantial degradation of the pulp.

2. The process as set forth in claim 1 in which the temperature of the bleaching reaction is not over 35° C.

LYLE MELVIN SHELDON.